3,290,211
**METHOD FOR REPELLING INSECTS WITH DI-
METHYLACRYLAMIDES AND DERIVATIVES**
Paul D. Schickedantz, Parma, Ohio, assignor to Union
Carbide Corporation, a corporation of New York
No Drawing. Filed Mar. 29, 1963, Ser. No. 269,166
16 Claims. (Cl. 167—22)

The invention relates to compositions of matter which repel insects, and particularly concerns amide derivatives of dimethylacrylic acid.

A number of amides have been tested for insect repellency, and these compounds have exhibited widely varying degrees of effectiveness. Diethyl m-toluamide, which is currently used both commercially and by the military forces as a repellent against a broad range of insects, exhibits excellent repellency against mosquitoes and against stable flies at relatively high concentrations, but is somewhat less effective against houseflies and against stable flies at lower concentrations. Repellency with respect to mosquitoes of 75 different amide compounds is shown by E. T. McCabe et al. in an article in the Journal of Organic Chemistry, 19, 493–8 (1954), with the test results indicating that the most promising mosquito repellents were amides of ring-substituted benzoic acids. Included within the list as exhibiting little activity (the poorest classification) was the compound, N,N-diethyl-$\beta,\beta$-dimethylacrylamide (or N,N-diethyl-seneciamide).

It has been discovered, however, that certain amide derivatives of dimethylacrylic acid exhibit excellent repellency against mosquitoes as well as other insects including stable flies and houseflies. These amides consist of the dimethylacrylamides having substituents on amido nitrogen selected from the class consisting of hydrogen, monovalent hydrocarbon groups of from 1 to 20 carbons inclusive, substituted derivatives thereof having substituents selected only from the class consisting of halo, amino, nitro, hydroxy, oxo, carboxy, and alkoxy of from 1 to 4 carbons, and divalent groups which form a heterocyclic ring with amido nitrogen of from 5 to 7 members inclusive. The divalent groups consist of a hydrocarbon, from 1 to 20 carbons inclusive, from 0 to 1 nitrogens inclusive as ring members only, from 0 to 2 oxygens inclusive as ring members only except when part of carbonyl, and from 0 to 1 sulfur inclusive as a ring member only. A further qualification is that when the amido nitrogen is substituted with monovalent groups, at least one of the substituents must contain at least four carbons except when both monovalent substituents contain three carbons (both are propyls).

Representative compounds include

N,N-di-n-propyl-dimethylacrylamide
N,N-diisopropyl-dimethylacrylamide
N-methyl-N-n-butyl-dimethylacrylamide
N,N-di-n-butyl-dimethylacrylamide
N-n-butyl-dimethylacrylamide
N,N-diisobutyl-dimethylacrylamide
N-isobutyl-dimethylacrylamide
N-t-butyl-dimethylacrylamide
N,N-di-n-pentyl-dimethylacrylamide
N-ethyl-N-n-pentyl-dimethylacrylamide
N,N-bis(2-ethylhexyl)-dimethylacrylamide
N-eicosyl-dimethylacrylamide
N,N-diheptyl-dimethylacrylamide
N-tetradecyl-dimethylacrylamide
N-heptyl-dimethylacrylamide
N-methyl-N-heptyl-dimethylacrylamide
N-octyl-dimethylacrylamide
N-ethyl-N-octyl-dimethylacrylamide
N,N-dioctyl-dimethylacrylamide
N-octadecyl-dimethylacrylamide
N-(2-ethylpentyl)-dimethylacrylamide
N-propyl-N-hexyl-dimethylacrylamide
N-hexyl-dimethylacrylamide
N-butenyl-dimethylacrylamide
N,N-dihexenyl-dimethylacrylamide
N-octadecenyl-dimethylacrylamide
N,N-dioctadecenyl-dimethylacrylamide
N-pentenyl-dimethylacrylamide
N,N-dicyclohexyl-dimethylacrylamide
N,N-dioctenyl-dimethylacrylamide
N-cyclohexyl-dimethylacrylamide
N-(o-chlorophenyl)-dimethylacrylamide
N-(p-hydroxyphenyl)-dimethylacrylamide
N-($\beta$-hydroxybutyl)-dimethylacrylamide
N-(m-aminophenyl)-dimethylacrylamide
N-(2,4,6-trinitrophenyl)-dimethylacrylamide
N-(2,4,6-tribromophenyl)-dimethylacrylamide
N-(2,4,6-triiodophenyl)-dimethylacrylamide
N-(m-nitrophenyl)-dimethylacrylamide
N-($\alpha$-oxobutyl)-dimethylacrylamide
N-($\beta$-aminobutyl)-dimethylacrylamide
N-($\beta$-nitrobutyl)-dimethylacrylamide
N-($\beta$-chlorobutyl)-dimethylacrylamide
N-(p-carboxyphenyl)-dimethylacrylamide
N-(o-methoxyphenyl)-dimethylacrylamide
N-(o-butoxyphenyl)-dimethylacrylamide
N-(p-methoxyphenyl)-dimethylacrylamide
N,N-di($\alpha$-methyl-$\beta$-hydroxyethyl)-dimethylacrylamide
N-butynyl-dimethylacrylamide
N,N-dipropynyl-dimethylacrylamide
N-(2-ethynylhexyl)-dimethylacrylamide
N-(p-ethynylphenyl)-dimethylacrylamide
N-eicosenyl-dimethylacrylamide
N-(3-methylcyclohexyl)-dimethylacrylamide
N-phenyl-dimethylacrylamide
N-cyclopentyl-dimethylacrylamide
N,N-diphenyl-dimethylacrylamide
N-(3-cyclohexenyl)-dimethylacrylamide
N-tolyl-dimethylacrylamide
N-xylyl-dimethylacrylamide
N-naphthyl-dimethylacrylamide
N-anthryl-dimethylacrylamide
N-phenanthyl-dimethylacrylamide
N-benzyl-dimethylacrylamide
N-($\beta$-phenylethyl)-dimethylacrylamide
N-(2-ethylbutyl)-dimethylacrylamide
1-dimethylacrylyl-pyrrolidine
1-dimethylacrylyl-piperidine
1-dimethylacrylyl-1,2,3,4-tetrahydro-quinoline
1-dimethylacrylyl-2,3,4,5-tetramethylpyrrolidine
1-dimethylacrylyl-2,3,4,5,6-pentamethylpiperidine
1-dimethylacrylyl-3,5-dimethylpiperidine
1-dimethylacrylyl-carbazole
1-dimethylacrylyl-indole
1-dimethylacrylyl-pyrrole
1-dimethylacrylyl-2,3,4,5-tetraethylpyrrolidine
1-dimethylacrylyl-2,3,4,5,6-pentapropylpiperidine
1-dimethylacrylyl-2,3,4,5,6-pentaethylpiperidine
1-dimethylacrylyl-3,5-dipropenylpiperidine
1,4-bis(dimethylacrylyl)-piperazine
1-dimethylacrylyl-morpholine
1-dimethylacrylyl-piperazine 1-dimethylacrylyl-piperidin-4-one
1-dimethylacrylyl-thiomorpholine
1-dimethylacrylyl-hexamethylenimine
1,3,5-tris(dimethylacrylyl)-trimethylenetriamine In general, the $\beta,\beta$-dimethylacrylamides are preferred as insect repellents over those in which the two methyl substituents are in $\alpha,\beta$ positions, and saturated aliphatic hydrocarbon groups are preferred over those containing ethylenic or acetylenic unsaturation. The groups alkyl, aryl, alkenyl, cycloalkyl, alkylaryl, and arylalkyl, however, may be mentioned as being within the preferred class of monovalent hydrocarbon groups suitable as a substituent on amido nitrogen as long as these groups contain no more than 20 carbons. These groups are also preferred in general over their substituted derivatives. Preferably, the divalent group on amido nitrogen contains no more than two heteroatoms as members of the ring formed with the amido nitrogen.

Amides in accordance with the invention can be prepared by the method described by E. T. McCabe et al. in the article referred to above, in which dimethylacrylyl chloride is added slowly with stirring to an ether solution of the nitrogen compound (amine) corresponding to the desired amide, such as pyrrolidine, piperidine, butyl amine, dibutylamine, and the like. An excess of the nitrogen compound is preferably employed to react with the hydrogen chloride liberated and cause it to precipitate as an amine hydrochloride. Alternatively, pyridine and other materials which complex with hydrogen chloride can be used in place of an excess of the nitrogen compound corresponding to the desired amide, and in some instances this procedure is preferred.

After the addition of the nitrogen compound is complete, the reaction mixture is stirred an hour or allowed to stand overnight. Water is added to dissolve the hydrochloride, and the aqueous layer thus formed is then separated from the ether layer. The remaining ether layer is washed successively with 5 percent by weight sodium hydroxide, and water and then dried by shaking with saturated sodium chloride and filtering through anhydrous magnesium sulfate. The ether is evaporated and the residue is distilled at reduced pressure if liquid, or recrystallized from hexane if solid.

A locus may be protected in accordance with the invention by applying an insect-repelling amount of one or more of the amides to the locus. The amide may be used in a pure or undiluted form, or may be mixed with a carrier in amounts up to below 100 percent by weight of the total composition before application. A concentration between about 0.1 and about 50 percent by weight of the amide in the total composition, for example, will be found to be advantageous for general use. Suitable carriers include materials which are non-injurious to the locus and which are compatible with the amide. Water, alcohols such as ethanol, isopropanol, propylene glycol, and glycerol, petroleum jelly, vanishing cream, and high-boiling petroleum fractions may be mentioned as suitable carriers in general. Surfactants may also be employed to promote the solubility of the amide in the carrier or to help maintain the amide on the locus to be protected. The amides may also be dispensed as aerosols with fluorohydrocarbons or other materials as the propellant, or as semisolid sticks with stearic acid, a paraffin, or other materials as the binder.

These repellent amides afford relatively lasting protection against one or more of such biting and blood sucking pests as: fresh water mosquitoes, *Aedes hirsuteron, Aedes stimulans, Aedes aegypti, Anopheles quadrimaculatus, Aedes triseriatus, Culex pipens, Aedes trivittatus,* and *Aedes vexans;* salt marsh mosquitoes, *Aedes sollicitans, Aedes cantator,* and *Aedes taeniorhynchus;* black flies, *Simulium* spp.; sand flies, *Culicoides* spp.; stable flies, *Stomoxys calcitrans;* deer flies, *Chrysops* spp.; cat fleas, *Ctenocephalides felis;* dog fleas, *Ctenocephalides canis;* stick tight fleas, *Echidnophaga gallinaces;* and chiggers or red bugs, *Trombicula* spp.

The following examples illustrate the invention more specifically. By the procedures described hereinbefore, the following compounds were prepared:

N,N-di-n-propyl-$\beta,\beta$-dimethylacrylamide from the reaction of $\beta,\beta$-dimethylacrylyl chloride and di-n-propylamine N,N-diisopropyl-$\beta,\beta$-dimethylacrylamide from the reaction of $\beta,\beta$-dimethylacrylyl chloride and diisopropylamine N,N-di-n-butyl-$\beta,\beta$-dimethylacrylamide from the reaction of $\beta,\beta$-dimethylacrylyl chloride and di-n-butylamine N-n-butyl-$\beta,\beta$-dimethylacrylamide from the reaction of $\beta,\beta$-dimethylacrylyl chloride and n-butylamine N,N-diisobutyl-$\beta,\beta$-dimethylacrylamide from the reaction of $\beta,\beta$-dimethylacrylyl chloride and diisobutylamine N-isobutyl-$\beta,\beta$-dimethylacrylamide from the reaction of $\beta,\beta$-dimethylacrylyl chloride and isobutylamine N-t-butyl-$\beta,\beta$-dimethylacrylamide from the reaction of $\beta,\beta$-dimethylacrylyl chloride and t-butylamine N,N-di-n-pentyl-$\beta,\beta$-dimethylacrylamide from the reaction of $\beta,\beta$-dimethylacrylyl chloride and di-n-pentylamine N,N-di(2-ethylhexyl)-$\beta,\beta$-dimethyl-acrylamide from the reaction of $\beta,\beta$-dimethylacrylyl chloride and di(2-ethylhexyl)amine 1-($\beta,\beta$-dimethylacrylyl)-pyrrolidine from the reaction of $\beta,\beta$-dimethylacrylyl chloride and pyrrolidine 1-($\beta,\beta$-dimethylacrylyl)-piperidine from the reaction of $\beta,\beta$-dimethylacrylyl chloride and piperidine 1-($\beta,\beta$-dimethylacrylyl)-1,2,3,4-tetrahydroquinoline from the reaction of $\beta,\beta$-dimethylacrylyl chloride and 1,2,3,4-tetrahydroquinoline 1-($\beta,\beta$-dimethylacrylyl)-hexamethylenimine from the reaction of $\beta,\beta$-dimethylacrylyl chloride and hexamethylenimine N-cyclohexyl-$\beta,\beta$-dimethylacrylamide from the reaction of $\beta,\beta$-dimethylacrylyl chloride and cyclohexylamine N,N-dicyclohexyl-$\beta,\beta$-dimethylacrylamide from the reaction of $\beta,\beta$-dimethylacrylyl chloride and dicyclohexylamine N-phenyl-$\beta,\beta$-dimethylacrylamide from the reaction of $\beta,\beta$-dimethylacrylyl chloride and phenylamine 1-($\beta,\beta$-dimethylacrylyl)-morpholine from the reaction of $\beta,\beta$-dimethylacrylyl chloride and morpholine 1,4-bis($\beta,\beta$-dimethylacrylyl)-piperazine from the reaction of $\beta,\beta$-dimethylacrylyl chloride and piperazine N,N-di-n-butyl-$\alpha,\beta$-dimethylacrylamide from the reaction of $\alpha,\beta$-dimethylacrylyl chloride and di-n-butylamine N-n-butyl-$\alpha,\beta$-dimethylacrylamide from the reaction of $\alpha,\beta$-dimethylacrylyl chloride and n-butylamine N-isobutyl-$\alpha,\beta$-dimethylacrylamide from the reaction of $\alpha,\beta$-dimethylacrylyl chloride and isobutylamine N,N-di-n-pentyl-$\alpha,\beta$-dimethylacrylamide from the reaction of $\alpha,\beta$-dimethylacrylyl chloride and di-n-pentylamine 1-($\alpha,\beta$-dimethylacrylyl)-piperidine from the reaction of $\alpha,\beta$-dimethylacrylyl chloride and piperidine N-octyl-$\beta,\beta$-dimethylacrylamide from the reaction of $\beta,\beta$-dimethylacrylyl chloride and octylamine N-octadecyl-$\beta,\beta$-dimethylacrylamide from the reaction of $\beta,\beta$-dimethylacrylyl chloride and octadecylamine These compounds were tested for insect repellency according to the following procedures:

(1) *Procedure for Repellency Rating for Mosquitoes and Stable Flies:* A compound for testing was mixed with acetone in several concentrations, and each solution was applied to cotton stockinette cloth. The stockinette cloth was placed over an arm of a tester and exposed to caged mosquitoes (*Aedes aegypti*) or stable flies (*Stomoxys calcitrans*), including both males and females, at intervals after treatment of four hours, one day, and two days. Between exposures the treated cloth was hung in a cabinet ventilated with a fan. The insect-repelling amides were rated as follows:

TABLE I

*Designations for effectiveness against mosquitoes and stable flies*

| Designation: | Effectiveness |
|---|---|
| 5 | 80–100% repellency or 0 to 1 bite in two minutes exposure. |
| 4 | 60–79% repellency or 2 to 4 bites in two minutes exposure. |
| 3 | 40–59% repellency or 5 to 10 bites in two minutes exposure. |
| 2 | 20–39% repellency or 11 to 15 bites in two minutes exposure. |
| 1 | 0–19% repellency or 16+ bites in two minutes exposure. |

(2) Procedure for Repellency Rating for Houseflies: A compound for testing was dissolved in acetone in several concentrations, and each solution was applied to a strip (1 inch by 2 inches) of white blotting paper having three holes punched therein. The strips were allowed to dry for 24 hours and then backed with cellophane tape. A drop of Diamalt extract was placed in each of the three holes.

A standard food strainer five inches in diameter was inverted over standard blotting paper to form a cage, and 25 adult houseflies (*Musca domestica*), four to six days old, both male and female, and anesthetized with $CO_2$, were transferred to the cage and permitted to recover. One hour after recovery, a treated and an untreated strip, both containing Diamalt extract, were inserted in the cage. The flies were allowed to feed on the untreated strip for three minutes before counts on the treated strip were initiated. Five observations were made at intervals of three minutes. At the end of the test, the total count of flies feeding on the untreated strip was compared with the total number feeding on the treated strip, and each insect-repelling compound was rated as shown in Table II according to the following formula Percent repellency =

$$100 \times \frac{\text{Number feeding on untreated strip minus number feeding on treated strip}}{\text{Number feeding on untreated strip}}$$

TABLE II

*Designations for effectiveness against houseflies*

| Designation: | Percent repellency |
|---|---|
| 5 | 90 to 100 |
| 4 | 75 to 89 |
| 3 | 50 to 74 |
| 2 | 25 to 49 |
| 1 | 0 to 24 |

Tables III and IV show the results of the above repellency tests as well as test results of three known compounds which may be considered as reference standards for purposes of the present invention.

TABLE III

*Repellency rating of insect-repelling compounds of invention*

Compound:

$$\begin{array}{c} CH_3 \\ \phantom{x} \\ CH_3 \end{array} C=CH-\overset{O}{\underset{\|}{C}}-N\begin{array}{c} R^1 \\ \phantom{x} \\ R^2 \end{array}$$

| Compound No. | $R^1$ | $R^2$ | Molecular Formula | Mosquitoes—Concentration | | | | | | | | | | | |
|---|---|---|---|---|---|---|---|---|---|---|---|---|---|---|---|
| | | | | 2.5% | | | 1.0% | | | 0.5% | | | 0.25% | | |
| | | | | 4 hr. | 1 day | 2 days | 4 hr. | 1 day | 2 days | 4 hr. | 1 day | 2 days | 4 hr. | 1 day | 2 days |
| 1 | $CH_3CH_2CH_2$ | $CH_3CH_2CH_2$ | $C_{11}H_{21}NO$ | 5 | 3 | | | | | | | | | | |
| 2 | $(CH_3)_2CH$ | $(CH_3)_2CH$ | $C_{11}H_{21}NO$ | 5 | 3 | | | | | | | | | | |
| 3 | $CH_3CH_2CH_2CH_2$ | $CH_3CH_2CH_2CH_2$ | $C_{13}H_{25}NO$ | 5 | 5 | 5 | | | | | | | | | |
| 4 | $CH_3CH_2CH_2CH_2$ | H | $C_9H_{17}NO$ | 5 | 5 | 5 | 5 | 5 | 5 | 5 | 5 | 1 | 5 | 3 | 1 |
| 5 | $(CH_3)_2CHCH_2$ | $(CH_3)_2CHCH_2$ | $C_{13}H_{25}NO$ | 5 | 3 | | | | | | | | | | |
| 6 | $(CH_3)_2CHCH_2$ | H | $C_9H_{17}NO$ | 5 | 5 | 5 | 5 | 5 | 5 | 5 | 5 | 1 | 5 | 1 | 1 |
| 7 | $(CH_3)_3C$ | H | $C_9H_{17}NO$ | | | | | | | | | | | | |
| 8 | $CH_3CH_2CH_2CH_2CH_2$ | $CH_3CH_2CH_2CH_2CH_2$ | $C_{15}H_{29}NO$ | 2 | 2 | 2 | | | | | | | | | |
| 9 | $CH_3CH_2CH_2CH_2CH(CH_2CH_3)$ | $CH_3CH_2CH_2CH_2CH(CH_2CH_3)$ | $C_{21}H_{41}NO$ | 3 | 1 | | | | | | | | | | |
| 10 | cyclohexyl | H | $C_{11}H_{19}NO$ | | | | | | | | | | | | |

TABLE III—Continued

| Compound No. | Compound $CH_3 \backslash C=CH-C(=O)-N(R^1)(R^2) / CH_3$ R¹ | R² | Molecular Formula | Mosquitoes—Concentration 2.5% | | | 1.0% | | | 0.5% | | | 0.25% | | |
|---|---|---|---|---|---|---|---|---|---|---|---|---|---|---|---|
| | | | | 4 hr. | 1 day | 2 days | 4 hr. | 1 day | 2 days | 4 hr. | 1 day | 2 days | 4 hr. | 1 day | 2 days |
| 11 | cyclohexyl | cyclohexyl | $C_{17}H_{29}NO$ | | | | | | | | | | | | |
| Reference Standards: | | | | | | | | | | | | | | | |
| Diethyl m-toluamide | | | | 5 | 5 | 5 | 5 | 5 | 5 | 5 | 4 | 2 | 5 | 1 | 1 |
| Diallyl adipate | | | | | | | | | | | | | | | |
| N,N-diethyl-β,β-dimethylacrylamide | | | | 3 | 1 | | | | | | | | | | |

| Compound No. | Stable Flies—Concentration 2.5% | | | 1.0% | | | 0.5% | | | 0.25% | | | Housefly—Concentration One day | | |
|---|---|---|---|---|---|---|---|---|---|---|---|---|---|---|---|
| | 4 hr. | 1 day | 2 days | 4 hr. | 1 day | 2 days | 4 hr. | 1 day | 2 days | 4 hr. | 1 day | 2 days | 2% | 1% | 0.5% |
| 1 | 5 | 1 | | | | | | | | | | | 3 | | |
| 2 | 5 | 2 | | | | | | | | | | | 1 | | |
| 3 | 5 | 5 | 5 | | | | | | | | | | 4 | 2 | 1 |
| | | | | | | | | | | | | | 5 | 4 | 1 |
| 4 | 5 | 5 | 5 | 5 | 5 | 5 | 5 | 5 | 3 | 5 | 5 | 1 | 3 | | |
| 5 | 5 | 1 | | | | | | | | | | | 1 | | |
| 6 | 5 | 5 | 5 | 5 | 5 | 5 | 5 | 5 | 2 | 5 | 3 | 1 | 1 | | |
| 7 | | | | | | | | | | | | | 1 | | |
| 8 | 2 | 2 | 2 | | | | | | | | | | 4 | 1 | 1 |
| 9 | 4 | 2 | | | | | | | | | | | 4 | 4 | 3 |
| 10 | | | | | | | | | | | | | 1 | | |
| 11 | | | | | | | | | | | | | 3 | | |

| Reference Standards | Stable Flies—Concentration 2.5% | | | 1.0% | | | 0.5% | | | 0.25% | | | Housefly—Concentration One day | | |
|---|---|---|---|---|---|---|---|---|---|---|---|---|---|---|---|
| | 4 hr. | 1 day | 2 days | 4 hr. | 1 day | 2 days | 4 hr. | 1 day | 2 days | 4 hr. | 1 day | 2 days | 2% | 1% | 0.5% |
| Diethyl m-toluamide | 5 | 5 | 5 | 4 | 4 | 4 | 4 | 3 | 1 | 3 | 2 | 1 | 1 | | |
| | | | | | | | | | | | | | 2 | 1 | 1 |
| Diallyl adipate | | | | | | | | | | | | | 5 | | |
| | | | | | | | | | | | | | 5 | 3 | 1 |
| | | | | | | | | | | | | | 5 | 4 | 3 |
| | | | | | | | | | | | | | 5 | 4 | 5 |
| N,N-diethyl-β,β-dimethyl-acrylamide | 1 | 1 | | | | | | | | | | | 1 | | |

TABLE IV

*Repellency rating of insect-repelling compounds of invention*

| $CH_3 \backslash C=CH-C(=O)-R^3 / CH_3$ R³= | Molecular Formula | Mosquitoes—Concentration 2.5% | | | 1.25% | | | Stable Flies—Concentration 2.5% | | | 1.25% | | | Housefly—Concentration One day | | |
|---|---|---|---|---|---|---|---|---|---|---|---|---|---|---|---|---|
| | | 4 hr. | 1 day | 2 days | 4 hr. | 1 day | 2 days | 4 hr. | 1 day | 2 days | 4 hr. | 1 day | 2 days | 2% | 1% | 0.5% |
| pyrrolidinyl (CH₂-CH₂-CH₂-CH₂-N) | $C_9H_{15}NO$ | | | | | | | | | | | | | 1 | | |
| piperidinyl (CH₂-CH₂-CH₂-CH₂-CH₂-N) | $C_{10}H_{17}NO$ | 5 | 5 | 2 | 5 | 5 | 1 | 5 | 5 | 2 | 5 | 4 | 1 | 1 | | |

TABLE IV—Continued

| $\begin{array}{c}CH_3\\ \phantom{C}\diagdown\\ \phantom{CH_3}C=CH-\overset{O}{\underset{\|}{C}}-R_3\\ \phantom{C}\diagup\\ CH_3\end{array}$ $R_3=$ | Molecular Formula | Mosquitoes—Concentration | | | | | | Stable Flies—Concentration | | | | | | Housefly—Concentration | | |
|---|---|---|---|---|---|---|---|---|---|---|---|---|---|---|---|---|
| | | 2.5% | | | 1.25% | | | 2.5% | | | 1.25% | | | One day | | |
| | | 4 hr. | 1 day | 2 days | 4 hr. | 1 day | 2 days | 4 hr. | 1 day | 2 days | 4 hr. | 1 day | 2 days | 2% | 1% | 0.5% |
|  | C₁₄H₁₇NO | | | | | | | | | | | | | 1 | | |
|  | C₁₁H₁₉NO | | | | | | | | | | | | | 5 | 3 | 2 |
| Reference Standards: Diethyl-m-toluamide | | 5 | 5 | 5 | 5 | 5 | 5 | 5 | 5 | 5 | 5 | 5 | 5 | 1 2 5 | 1 | 1 |
| Diallyl adipate | | | | | | | | | | | | | | 5 5 5 | 3 4 4 | 1 3 5 |

As these results indicate, the dimethylacrylamides defined herein as insect repellents are very effective. The normal butyl N-substituted dimethylacrylamides should be particularly noticed since they exhibit insect repellency superior to diethyl m-toluamide, a compound commercially sold as an insect repellent. A further fact shown by the test results is that there is a surprising difference in repellency between the N-ethyl substituted amides and the N-propyl and N-butyl substituted amides.

It will also be realized that certain mixtures of the dimethylacrylamides may possess a better repellency against several varieties of insects than a single compound. For example, a mixture of the N-isobutyl amide and the N,N-di(2-ethylhexyl)amide will exhibit excellent repellency against all three common insects, mosquitoes, stable flies, and houseflies

What is claimed is:

1. A method for protecting a locus from insects which method comprises applying to said locus an insect repelling amount of at least one dimethylacrylamide having a substituent on the amido nitrogen which is a member of the group consisting of hydrogen, a monovalent hydrocarbon group of from 1 to 20 carbons, a substituted derivative thereof having a substituent selected from the group consisting of halo, amino, nitro, hydroxy, oxo, carboxy, alkoxy from 1 to 4 carbon atoms and a divalent group which forms a heterocyclic ring with the amido nitrogen of from 5 to 7 members, said divalent group being a member selected from the group consisting of a hydrocarbon of from 1 to 20 carbons, a hydrocarbon of from 1 to 20 carbons and one nitrogen as a ring member, a hydrocarbon of from 1 to 20 carbons and 1 to 2 oxygens as ring members except when part of a carbonyl, and a hydrocarbon from 1 to 20 carbons and one sulfur as a ring member, said amido nitrogen when substituted with monovalent groups having at least one substituent with at least 4 carbons except when both monovalent substituents contain 3 carbons.

2. The method defined in claim 1 wherein said dimethylacrylamide is β,β-dimethylacrylamide.

3. The method defined in claim 1 wherein said dimethylacrylamide is α,β-dimethylacrylamide.

4. A method for protecting a locus from insects, which method comprises applying to said locus an insect-repelling amount of N-alkyl-β,β-dimethylacrylamide wherein the N-alkyl moiety contains from 4 to 20 carbons inclusive.

5. A method for protecting a locus from insects, which method comprises applying to said locus an insect-repelling amount of N,N-dialkyl-β,β-dimethylacrylamide wherein one of the N,N-dialkyl moieties contains from 1 to 20 carbons inclusive and the other contains from 4 to 20 carbons inclusive except when both N,N-dialkyl moieties are propyls.

6. A method for protecting a locus from insects, which method comprises applying to said locus an insect repelling amount of N,N-dipropyl-β,β-dimethylacrylamide.

7. A method for protecting a locus from insects, which method comprises applying to said locus an insect-repelling amount of N,N-dibutyl-β,β-dimethylacrylamide.

8. A method for protecting a locus from insects, which method comprises applying to said locus an insect-repelling amount of N-butyl-β,β-dimethylacrylamide.

9. A method for protecting a locus from insects, which method comprises applying to said locus an insect-repelling amount of N,N-dipentyl-β,β-dimethylacrylamide.

10. A method for protecting a locus from insects, which method comprises applying to said locus an insect-repelling amount of N,N-bis(2-ethylhexyl)-β,β-dimethylacrylamide.

11. A method for protecting a locus from insects, which method comprises applying to said locus an insect-repelling amount of 1-(β,β-dimethylacrylyl)-pyrrolidine.

12. A method for protecting a locus from insects, which method comprises applying to said locus an insect-repelling amount of 1-(β,β-dimethylacrylyl)-piperidine.

13. A method for protecting a locus from insects, which method comprises applying to said locus an insect-repelling amount of 1-(β,β-dimethylacrylyl)-1,2,3,4-tetrahydroquinoline.

14. A method for protecting a locus from insects, which method comprises applying to said locus an insect-repelling amount of 1-(β,β-dimethylacrylyl)-hexamethylenimine.

15. A method for protecting a locus from insects, which method comprises applying to said locus an insect-repelling amount of N-cyclohexyl-β,β-dimethylacrylamide.

16. A method for protecting a locus from insects, which method comprises applying to said locus an insect-repelling amount of N,N-dicyclohexyl-$\beta,\beta$-dimethylacrylamide.

References Cited by the Examiner

UNITED STATES PATENTS

| | | | |
|---|---|---|---|
| 2,350,324 | 6/1944 | Coleman et al. | 167—33 |
| 2,529,838 | 11/1950 | Erickson | 260—561 |
| 2,719,178 | 9/1955 | Coover et al. | 260—561 |
| 2,758,135 | 8/1956 | Miller | 260—561 |
| 2,773,063 | 12/1956 | Specht et al. | 260—561 |
| 2,865,960 | 12/1958 | Shearer et al. | 260—561 |

JULIAN S. LEVITT, *Primary Examiner.*

GEORGE A. MENTIS, *Assistant Examiner.*